US010891232B2

(12) United States Patent
Lopes et al.

(10) Patent No.: US 10,891,232 B2
(45) Date of Patent: Jan. 12, 2021

(54) PAGE-BASED MEMORY OPERATION WITH HARDWARE INITIATED SECURE STORAGE KEY UPDATE

(71) Applicant: INTERNATIONAL BUSINESS MACHINES CORPORATION, Armonk, NY (US)

(72) Inventors: Kevin Lopes, Wallkill, NY (US); Deanna P. D. Berger, Hyde Park, NY (US); Jason D Kohl, Austin, TX (US); Robert J Sonnelitter, III, Mount Vernon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 16/360,468

(22) Filed: Mar. 21, 2019

(65) Prior Publication Data

US 2020/0301832 A1 Sep. 24, 2020

(51) Int. Cl.
*G06F 12/00* (2006.01)
*G06F 12/084* (2016.01)
*G06F 3/06* (2006.01)

(52) U.S. Cl.
CPC ............ *G06F 12/084* (2013.01); *G06F 3/062* (2013.01); *G06F 3/0655* (2013.01); *G06F 3/0673* (2013.01); *G06F 2212/622* (2013.01)

(58) Field of Classification Search
None
See application file for complete search history.

(56) References Cited

U.S. PATENT DOCUMENTS

| 7,899,997 | B2* | 3/2011 | Michael | G06F 9/52 |
| | | | | 711/150 |
| 8,631,274 | B2 | 1/2014 | Frost et al. | |
| 8,977,807 | B2 | 3/2015 | Frost et al. | |
| 9,128,762 | B2* | 9/2015 | Hulbert | G06F 12/1009 |

(Continued)

OTHER PUBLICATIONS

Anonymous, A Generalized Test Scenario for Testing Transactions Atomicity in Hardware or Software Products, ip.com, Dec. 25, 2013, pp. 1-4.

(Continued)

*Primary Examiner* — John A Lane
(74) *Attorney, Agent, or Firm* — Cantor Colburn LLP; William Kinnaman

(57) ABSTRACT

Methods and systems for secure storage protection for memory operations are provided. Aspects include providing a drawer comprising a plurality of clusters, each of the plurality of clusters comprising a plurality of processors, wherein each of the plurality of clusters share a first cache memory, providing a cluster shared cache integrated circuit to manage a second cache memory shared among the plurality of clusters, providing a system memory associated with each of the plurality of clusters, receiving, by a memory controller, a memory operation request from one of the plurality of processors, wherein the memory operation includes a store command, and wherein the memory controller is configured to perform the memory operation and atomically write a secure storage key for the memory operation with the store command of the memory operation.

15 Claims, 4 Drawing Sheets

(56) References Cited

U.S. PATENT DOCUMENTS

| | | | |
|---|---|---|---|
| 9,460,011 B1* | 10/2016 | Kraemer | G06F 12/0875 |
| 9,563,426 B1* | 2/2017 | Bent | H04L 67/1097 |
| 9,971,533 B2 | 5/2018 | Farrell et al. | |
| 2009/0217098 A1 | 8/2009 | Farrell et al. | |
| 2012/0166715 A1 | 8/2012 | Frost et al. | |
| 2016/0085693 A1 | 3/2016 | Frost et al. | |
| 2016/0170850 A1* | 6/2016 | Williams | G06F 3/065 |
| | | | 714/6.23 |
| 2016/0241475 A1* | 8/2016 | Wang | H04L 45/7453 |
| 2018/0341422 A1 | 11/2018 | Berger et al. | |

OTHER PUBLICATIONS

Anonymous, "Method and System for Recovering Partial Writes on a Storage System Using Log Structured Array", ip.com, Dec. 29, 2016, pp. 1-6.

Anonymous, "Undoable Writes", ip.com, Jun. 18, 2010, pp. 1-5.

D. Gruss et al., "Strong and Efficient Cache Side-Channel Protection using Hardware Transactional Memory", 26th Usenix Security Symposium, Aug. 16-18, 2017, Vancouver, BC, Canada, pp. 217-233.

K. Konig et al., "No Need to Hide: Protecting Safe Regions on Commodity Hardware", EuroSys '17, Apr. 23-26, 2017, Belgrade, Serbia, pp. 1-16.

Slegel, Timothy et al., "Move Data and Set Storage Key Function Control," U.S. Appl. No. 16/283,976, filed Feb. 25, 2019, pp. 1-46.

Slegel, Timothy et al., "Move Data and Set Storage Key Instruction," U.S. Appl. No. 16/283,966, filed Feb. 25, 2019, pp. 1-45.

* cited by examiner

PAGE-BASED MEMORY OPERATION WITH HARDWARE INITIATED SECURE STORAGE KEY UPDATE

BACKGROUND

The present invention generally relates to operations on memory pages, and more specifically, to memory operations with hardware initiated checking and update of secure storage keys.

At least a portion of a computing environment is typically shared among multiple processes executing within the computing environment. This sharing of storage increased the risk of comprising the integrity of the data stored in the storage. Thus, in order to provide data integrity, certain storage protections are applied. These protections are used to manage the storage, and thereby, protect the data.

In certain systems, when a processor accesses a unit of data from storage, cache line data is returned with a key value associated with a page from which the cache line data was fetched. The returned key is then checked against the key assigned to a program or user to determine if the access is in violation or is permitted before continuing with program execution. Certain memory operations, such as move page, store pad and page clear commands, involve the writing of new keys for the moved or cleared memory page. A software operation is needed to first issue the move, pad or clear command. The software then needs to wait on a hardware operation to process this command and then issue a separate command to write the key for the page.

SUMMARY

Embodiments of the present invention are directed to a computer-implemented method for secure storage protection for memory operations. A non-limiting example of the computer-implemented method includes providing a drawer comprising a plurality of clusters, each of the plurality of clusters comprising a plurality of processors, wherein each of the plurality of clusters share a first cache memory, providing a cluster shared cache integrated circuit to manage a second cache memory shared among the plurality of clusters, providing a system memory associated with each of the plurality of clusters, receiving, by a memory controller, a memory operation request from one of the plurality of processors, wherein the memory operation includes a store command, and wherein the memory controller is configured to perform the memory operation and atomically write a secure storage key for the memory operation with the store command of the memory operation.

Embodiments of the present invention are directed to a system for secure storage protection for memory operations. A non-limiting example of the system includes a drawer comprising a plurality of clusters, each of the plurality of clusters comprising a plurality of processor, wherein each of the plurality of clusters share a first cache memory, a cluster shared cache integrated circuit to manage a second cache memory shared among the plurality of clusters, a system memory associated with each of the plurality of clusters, and a memory controller is configured to receive a memory operation request from one of the plurality of processors, wherein the memory operation includes a store command, perform the memory operation, and atomically write a secure storage key for the memory operation with the store command of the memory operation.

Embodiments of the invention are directed to a computer program product for secure storage protection for memory operations, the computer program product comprising a computer readable storage medium having program instructions embodied therewith. The program instructions are executable by a processor to cause the processor to perform a method. A non-limiting example of the method includes receiving a memory operation request from one of a plurality of processors, wherein the memory operation includes a store command, performing the memory operation, and atomically writing a secure storage key for the memory operation with the store command of the memory operation.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The foregoing and other features, and advantages of the embodiments herein are apparent from the following detailed description taken in conjunction with the accompanying drawings in which:

Figure 1:
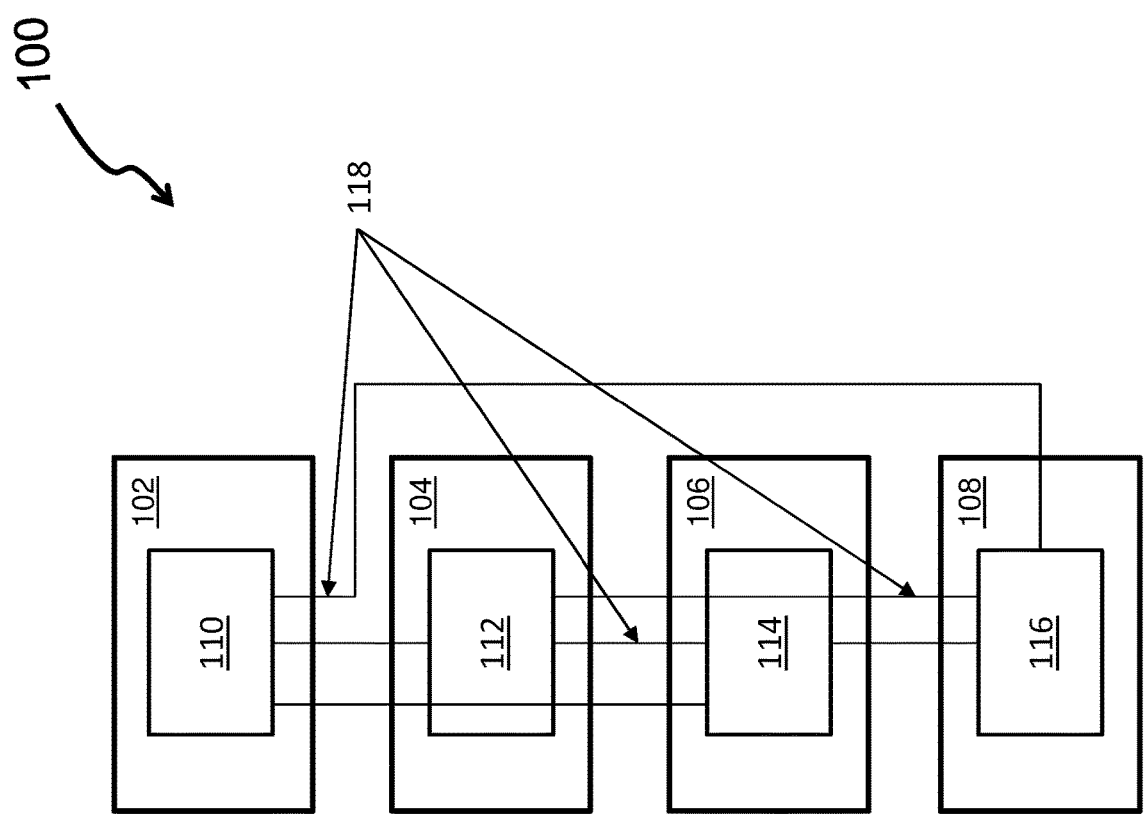
FIG. 1 depicts a block diagram of a distributed symmetric multiprocessing (SMP) system in accordance with one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in modern multi-processor computer systems, a hierarchy of caches is used to buffer memory cache lines in order to reduce the access time overhead of data in memory. Highly distributed, large symmetric multiprocessing (SMP) systems can share high-level cache (e.g., L4 cache). Prior SMP systems required tradeoffs to be made between the amount of available IA cache and the level of connectivity between processors to accommodate cost and packaging constraints. Existing SNIP systems can include multiple drawers, where each drawer contains two independent and separate nodes. These nodes in turn each contain multiple central processing (CP) chips (e.g., integrated circuits) connected together with a dedicated shared cache (SC) chip. Each CP chip is a chip multiprocessor (CMP) with a private L1 and L2 cache per processor and one L3 cache shared by all the processors on the chip. The SC chip includes an L4 cache and system interconnect logic.

Turning now to a more detailed description of aspects of the present invention, FIG. 1 depicts a distributed symmetric multiprocessing (SMP) system 100 (hereafter "system 100") in accordance with one or more embodiments. System 100 can include 4 processing units or "drawers." Drawer 102 (described in greater detail with respect to FIG. 2) connects to drawer 104, drawer 106, and drawer 108 via a system chip (SC) (sometimes referred to as an integrated circuit (IC)) 110. Drawers 104, 106, and 108 each have a respected SC chip (e.g., SC chip 112, SC chip 114, SC chip 116). Bus lines 118 connect drawers 102, 104, 106, and 108. Intra-drawer coherency communication may be performed using pass-through and a combination of these bus-lines, 118. In one or more embodiments, the system 100 can include more or less than a total of four drawers; for example, the system 100 can include five drawers.

In an embodiment, cache lines that are owned or shared by processors of an entity at a level of coherency (cluster, CP Chip, drawer) are candidates to be handled at the level of coherency. Thus, if a processor of the entity requests ownership or sharing of a line that is already owned by a processor of the same entity (e.g., CP Chip or drawer), the entity need not access other entities to handle the request coherently. A request, for example, by a processor of a CP chip within a CP cluster, for sharing of a cache line is examined by memory controller function to determine if the line is owned or shared by a processor of the CP cluster. If it is already owned or shared, the memory controller handles the request within the CP cluster without accessing any other CP clusters. If the line is neither owned nor shared by a processor of the CP cluster, the memory controller of the initial CP cluster performs a cache coherency operation with the other CP chips on the other CP clusters connected to that SC chip or on the other drawers via the SC chips on those drawers.

Figure 2:
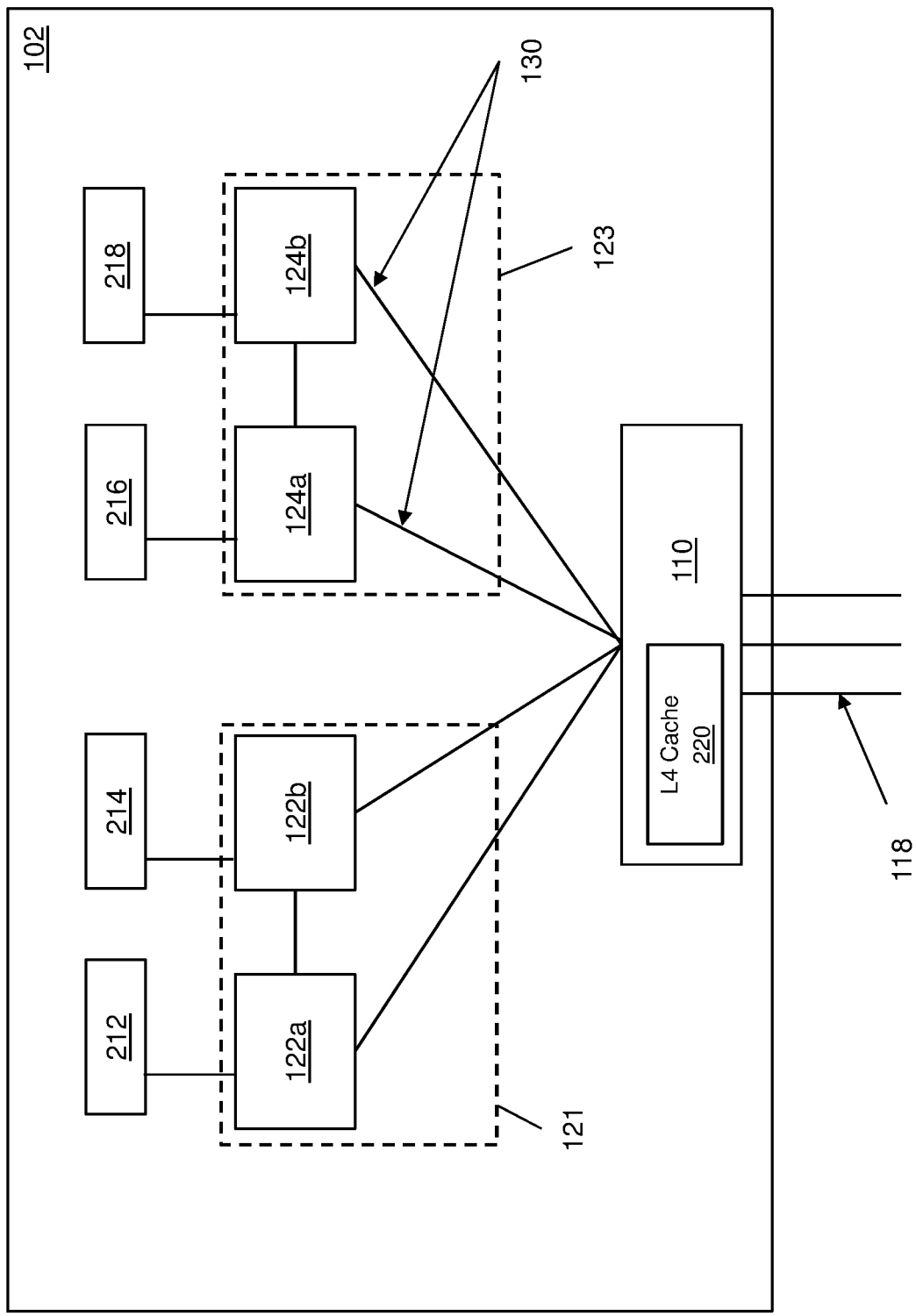
FIG. 2 depicts a block diagram of a drawer in a distributed symmetric multiprocessing (SMP) system in accordance with one or more embodiments of the invention.

FIG. 2 depicts drawer 102 in greater detail, according to one or more embodiments. Although FIG. 2 depicts only drawer 102, it should be appreciated that a similar configuration is contemplated for drawers 104, 106, and 108, and/or other drawers in system 100. Referring now to FIG. 2, drawer 102 includes two CP clusters (e.g., CP cluster 121 and CP cluster 123). Each CP cluster contains individual CP chips. For example, CP cluster 121 contains CP chips 122a and 122b; and CP cluster 123 contains CP chips 124a and 124b. Each of the individual CP chips (e.g., CP chips 122a, 122b, 124a, 124b) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP chip 122a includes multiple processing cores that each have their own L1/L2 cache, and the multiple processing cores within the CP cluster 121 share an L3 cache. Each respective CP chip may be connected to system memory (e.g., system memory 212, system memory 214, system memory 216, and system memory 218). CP cluster 121 is operatively connected with each of the other clusters (e.g., 123) via bus lines 130 through the SC chip 110. In other aspects, a CP cluster may include any number of CP chips, although embodiments are described as having only two.

The SC chip 110 includes interconnects for communication with each CP chip (e.g., CP chips 122a, 122b, 124a, 124b) in both clusters 121, 123 on the drawer 102 and for communication with other SC chips on other drawers (e.g., the SC 112 of the drawer 104, the SC 114 of the drawer 106, the SC 116 of the drawer 108, etc.). In one or more embodiments of the invention, the SC chip 110 includes an L4 cache 220.

Figure 3:
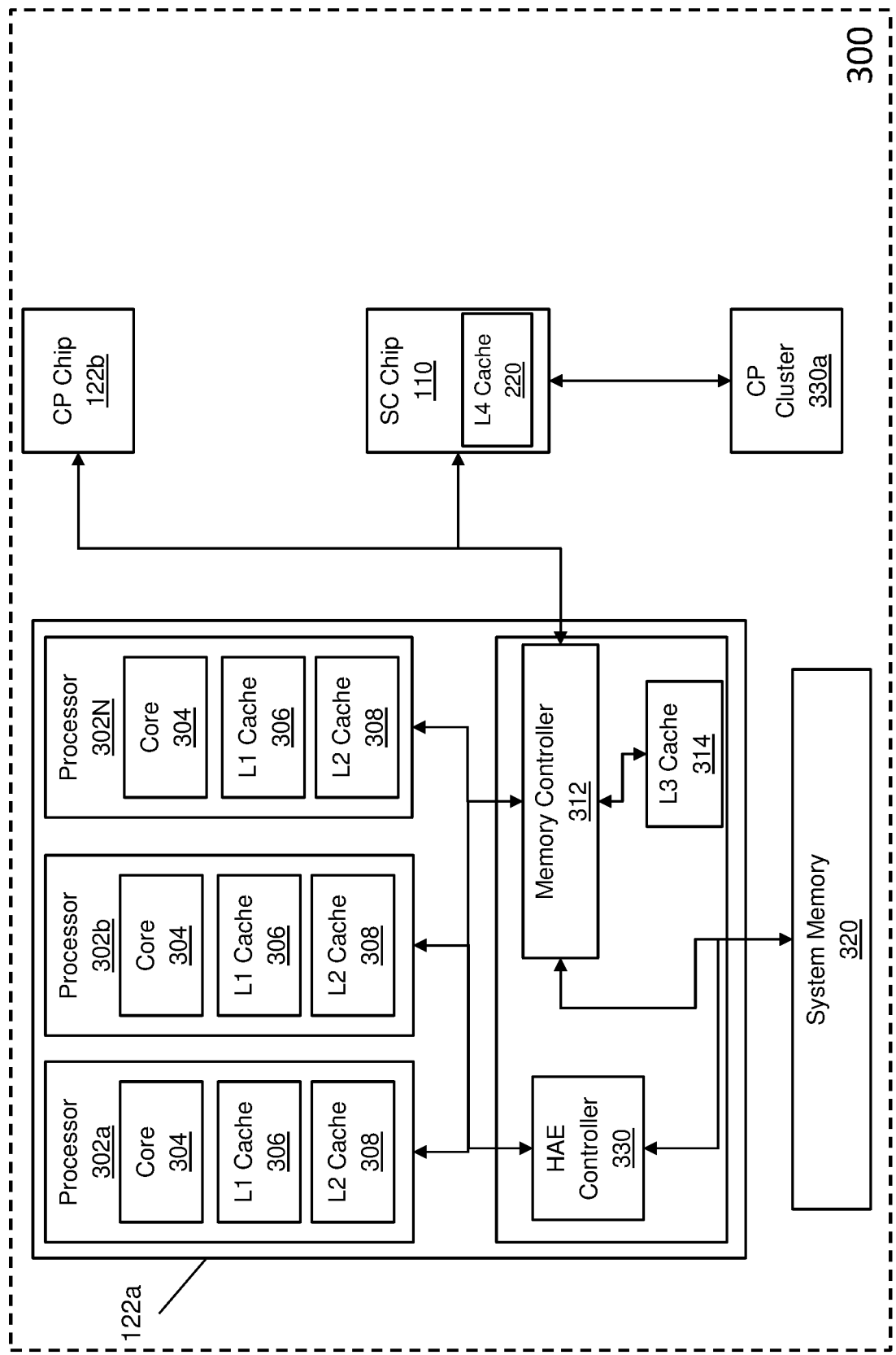
FIG. 3 depicts a block diagram of an exemplary symmetric multiprocessor (SMP) computer according to one or more embodiments of the invention.

FIG. 3 depicts a block diagram of an exemplary symmetric multiprocessor (SMP) computer according to one or more embodiments of the present invention. The system 300 includes at least one CP cluster 330a which may be directly connected or connected through other SC chips. As described in FIG. 2, each CP cluster includes two CP chips. CP chip 122a is depicted in greater detail in FIG. 3. CP chip 122a includes processors 302a-302N (where N is any whole number greater than 2). Each processor has one or more cores 304, an L1 cache 306, and an L2 cache 308. Each processor within the CP chip 122a is communicative coupled to a memory controller 312 on a shared cache level. The memory controller 312 can access the L3 cache 314. In one or more embodiments, each of the processors 302a-302N shares the L3 cache on the CP chip 122a. The memory controller 312 with the L3 cache implements a shared cache level across a CP cluster in the system 300.

The system memory 320 can include a random access store of program data and program instructions for data processing on the system 300. Main memory 320 is characterized by memory latency, the time required for a memory access, a read or write to or from main memory. In one or more embodiments, the system memory 320 can be a centaur dual inline memory module (DIMM).

Turning now to a more detailed description of aspects of the present invention, processing times for physical memory moves, "pads," and clears can affect overall system performance. In certain instances, usage of existing page-based move/clear commands involves writing a new key for the moved/cleared page. However, the software needed to issue the move/clear command must wait for the hardware to process the move/clear and then issue a separate command (e.g., set storage key extended (SSKE)) to the hardware to write the key. These move/clear commands often occur during workload startups/terminations and can consume between 1% and 5% of a workload's total cycles per instruction (CPI).

In one or more embodiments of the invention, a hardware acceleration engine controller 330 is included in the system 300. The hardware accelerator engine (HAE) controller 330 is utilized for high volume memory operations that take place in the system memory 320. For example, memory operations associated with a memory page are performed in the system memory 320 due to the size of the memory operation which cannot be performed in a cache. Some high volume memory operations include the move page command and the store pad command. Move page is a command that fetches a page from a location in the system memory 320 and moves the page to a new location in the system memory 320. The store pad command takes a smaller amount of data and replicates the small amount of data through a page. If the content of that smaller amount of data is zero data, the store pad is sometimes referred to as a "clear." Embodiments of the present invention combine the memory operations with a write secure storage key command to form a variant of the existing Move Page and Store Pad commands.

Embodiments of the invention combine the move/clear commands with the key write operation to improve performance of computing systems. Aspects include enabling a hardware write of a software supplied key as an atomic part of the existing page move and pad/clear operations. There are two new system operator (Sysop) commands to nest hardware, Move Page & Write Key and Store Pad & Write Key that supply the key to nest along with the target address. Move Page & Write Key is triggered via an enhancement to the instruction set architecture (ISA) move page command. Store Pad & Write key is triggered via an enhancement to the ISA perform frame management function (PFMF) command. After receiving the millicode (firmware) issued command, but prior to performing a move, the hardware checks for address validity, conflicts with ongoing dynamic memory relocation (DMR), and secure storage protection of the destination page. If all these checks pass, the hardware performs the page based move/pad/clear operation line by line, writing the key along with the data for each line of the move/pad/clear.

In one or more embodiments, the process for utilizing the above described command variants begins with a processing core, for example core 304, issuing a memory instruction or command on behalf of the millicode/firmware. Particularly, the move page command or the store pad command. As discussed herein, typically, computing system utilize different commands and processes for the execution of a move page or store pad and the write of the storage key. Embodiments herein define a new command variance that combines the move page and write key commands as well as the store pad and write key command so that these two separate commands can be performed together (e.g., on the store operation).

In one or more embodiments of the invention, the HAE controller 330 can receive a memory operation command from a processor (utilizing millicode). The mechanism for sending the memory operation command to the HAE is the millicode fetch address register (MFAR) controller which is associated with the processing core. The MFAR controller arbitrates for the HAE controller 330. When the memory operation command is sent, the HAE controller 330 can check for storage address validity for a destination page before performing the memory operation. If the storage address validity fails, the HAE controller 330 will not perform the memory operation, nor will the HAE controller 330 update the secure storage key and a reject condition code can be reported back to the processor. However, if the storage address validity does not fail, the HAE controller will perform a secure storage protection (SSP) check (including SSP UE detection) of the destination page key performing the memory operation via a new auto-generated hardware command. This command will be sent to the SC chip and will communicate with the memory controller the validity of the SSP with the associated page. A failure of the SSP checking will cause the HAE controller 330 to not perform the memory operation and not update the secure storage key with a reject condition being reported back to the processor.

In one or more embodiments of the invention, if the storage address validity passes and the SSP checking passes, the HAE controller 330 will perform an automatic hardware detection of dynamic memory relocation (DMR) in progress to a same segment resulting in the prevention of the memory operation and a reject condition code being reported back to the processor.

In one or more embodiments of the invention, if all prior checks mentioned above pass, the HAE controller 330 will perform the memory command variant. This variant will perform what the original memory command intends to do and writes the new key supplied by the requesting core in the same operation. The HAE controller will receive the supplied key to be written and conserve the new key to be sent along with each line in the page to be operated on by the L4. In the L4, a local store controller will receive the command and the necessary data. With the variant command, it is the responsibility of this local store controller to protect the cache line from being accessed by any other operation until the data and key have been written to memory. While the local store controller is active, any other attempts to access the cache line or the associated key will be blocked and must wait until the local store controller has indicated that it has finished. Upon receiving the variant command, the local store controller will ignore any other attempts to access the line or modify the key, and proceed with the store. After the data and key have been written to memory, it will indicate that it has finished, allowing other access to the line. If the controller were to indicate that it was finished before the store completed, it would be possible for another operation to observe the line with the previous key. The non-variant command that does not write the key does not protect this scenario because the key write command is uncoupled from the data store command.

Figure 4:
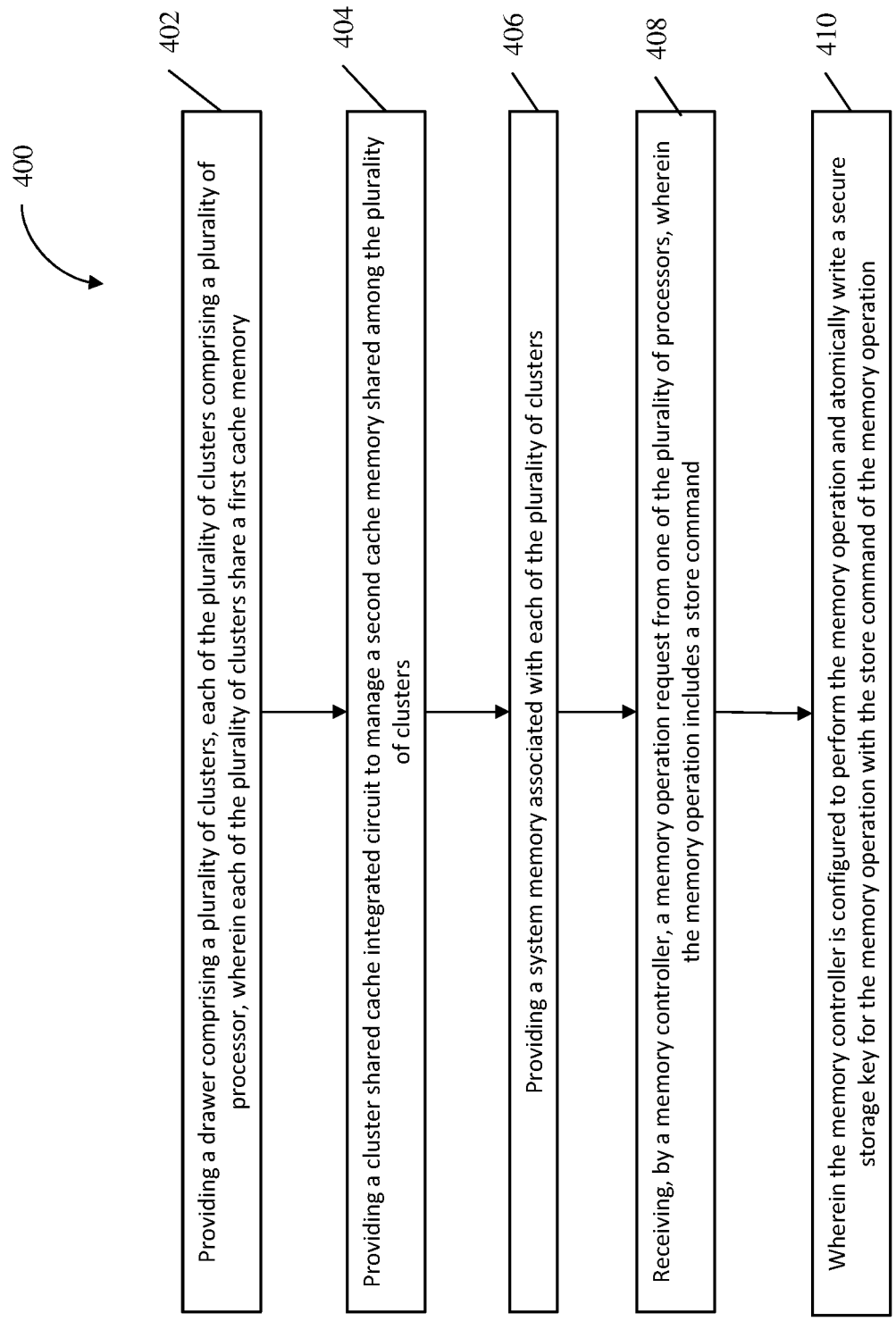
FIG. 4 depicts a flow diagram of a method for secure storage protection for memory operations according to one or more embodiments of the invention.

FIG. 4 depicts a flow diagram of a method for secure storage key writes for memory operations according to one or more embodiments of the invention. The method 400 includes providing a drawer (102-108) comprising a plurality of clusters (121, 123), each of the plurality of clusters comprising a plurality of processors (122a-122b, 124a-124b), wherein each of the plurality of clusters shares a first cache memory (314), as shown in block 402. At block 404, the method 400 includes providing a cluster shared cache integrated circuit (110) to manage a second cache memory (220) shared among the plurality of clusters. At block 406, the method 400 also includes providing a system memory (320) associated with each of the plurality of clusters. The method 400, at block 408, includes receiving, by a memory controller (312), a memory operation request from one of the plurality of processors, wherein the memory operation includes a store command. And at block 410, the method 400 includes the memory controller (312) configured to perform the memory operation and write a secure storage key for the memory operation with the store command of the memory operation.

Additional processes may also be included. It should be understood that the processes depicted in FIG. 4 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   providing a drawer comprising a plurality of clusters, each of the plurality of clusters comprising a plurality of processors, wherein each of the plurality of clusters shares a first cache memory;
   providing a cluster shared cache integrated circuit to manage a second cache memory shared among the plurality of clusters;
   providing a system memory associated with each of the plurality of clusters; and
   receiving, by a memory controller, a memory operation request from one of the plurality of processors, wherein the memory operation includes a store command;
   wherein the memory controller is configured to:
   perform the memory operation; and
   atomically write a secure storage key for the memory operation with the store command of the memory operation, wherein the memory operation includes a move page command;
   generating, by a hardware engine, the secure storage key for the move page command; and
   sending, to the memory controller, the secure storage key along with a destination page address for the move page command.

2. The computer-implemented method of claim 1, wherein performing the memory operation and writing the secure storage key comprise:
   defining, by the memory controller, a memory command comprising the memory operation and the write secure storage key.

3. The computer-implemented method of claim 1, wherein the memory operation is associated with the system memory.

4. The computer-implemented method of claim 1, wherein the memory operation includes a store pad command.

5. The computer-implemented method of claim 4, further comprising:
   generating, by a hardware engine, a secure storage key for the store pad command; and
   sending, to the memory controller, the secure storage key along with a target page address for the store pad command.

6. The computer-implemented method of claim 1, further comprising performing a storage validity check in the system memory for the memory operation.

7. The computer-implemented method of claim 1, further comprising performing a secure storage protection check for the memory operation.

8. The computer-implemented method of claim 7, further comprising overriding the secure storage protection check by supplying a generic key.

9. A system for secure storage protection for memory operations, the system comprising:
   a drawer comprising a plurality of clusters, each of the plurality of clusters comprising a plurality of processors, wherein each of the plurality of clusters shares a first cache memory;
   a cluster shared cache integrated circuit to manage a second cache memory shared among the plurality of clusters;
   a system memory associated with each of the plurality of clusters; and
   a memory controller configured to:
   receive a memory operation request from one of the plurality of processors, wherein the memory operation includes a store command;
   perform the memory operation; and
   atomically write a secure storage key for the memory operation with the store command of the memory operation, wherein the memory operation includes a move page command;
   generating, by a hardware engine, the secure storage key for the move page command; and
   sending, by the hardware engine to the memory controller, the secure storage key along with a destination page address for the move page command.

10. The system of claim 9, wherein performing the memory operation and writing the secure storage key comprise:

defining, by the memory controller, a memory command comprising the memory operation and the write secure storage key.

11. The system of claim 9, wherein the memory operation is associated with the system memory.

12. The system of claim 9, wherein the memory operation includes a store pad command.

13. A computer program product for secure storage protection for memory operations comprising a computer readable storage medium having program instructions embodied therewith, the program instructions executable by a memory controller to cause the memory controller to perform a method comprising:

receiving a memory operation request from one of a plurality of processors, wherein the memory operation includes a store command;

performing the memory operation; and atomically writing a secure storage key for the memory operation with the store command of the memory operation, wherein the memory operation includes a move page command;

generating, by a hardware engine, the secure storage key for the move page command; and sending, to a memory controller, the secure storage key along with a destination page address for the move page command.

14. The computer program product of claim 13, wherein performing the memory operation and writing the secure storage key comprise:

defining, by the memory controller, a memory command comprising the memory operation and the write secure storage key.

15. The computer program product of claim 13, wherein the memory operation is associated with a system memory.

* * * * *